United States Patent
Wahl et al.

(10) Patent No.: US 8,617,733 B2
(45) Date of Patent: Dec. 31, 2013

(54) ELECTROCHEMICAL ENERGY STORAGE DEVICE HAVING A RESERVOIR FOR AN ADDITIVE

(75) Inventors: Florian Wahl, Lohr (DE); Martin Holger Koenigsmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 711 days.

(21) Appl. No.: 12/451,306

(22) PCT Filed: Apr. 9, 2008

(86) PCT No.: PCT/EP2008/054292
§ 371 (c)(1),
(2), (4) Date: Feb. 17, 2010

(87) PCT Pub. No.: WO2008/145450
PCT Pub. Date: Dec. 4, 2008

(65) Prior Publication Data
US 2010/0190042 A1    Jul. 29, 2010

(30) Foreign Application Priority Data
May 25, 2007    (DE) .......................... 10 2007 024 394

(51) Int. Cl.
*H01M 6/50*    (2006.01)
*H01M 2/36*    (2006.01)
*H01M 2/38*    (2006.01)
*H01M 10/44*    (2006.01)

(52) U.S. Cl.
USPC ................................. 429/72; 429/51; 429/74

(58) Field of Classification Search
USPC .................... 429/50, 72, 209, 338, 51, 63, 74
See application file for complete search history.

(56) References Cited

U.S. PATENT DOCUMENTS

| 4,038,459 | A * | 7/1977 | Ajami et al. ................... 429/347 |
| 4,104,447 | A * | 8/1978 | Walsh et al. .................... 429/51 |
| 4,147,840 | A * | 4/1979 | Walsh et al. .................... 429/50 |
| 6,093,503 | A * | 7/2000 | Isoyama et al. ................. 429/61 |
| 6,355,373 | B1  | 3/2002 | Pauling |
| 7,147,972 | B2 * | 12/2006 | Fitter et al. .................... 429/347 |
| 2006/0159985 | A1 * | 7/2006 | Jones .............................. 429/72 |
| 2007/0099044 | A1 * | 5/2007 | Tung ............................... 429/22 |
| 2008/0241643 | A1 * | 10/2008 | Lepp et al. ....................... 429/61 |
| 2011/0236730 | A1 * | 9/2011 | Jones .............................. 429/50 |

FOREIGN PATENT DOCUMENTS

| DE | 28 56 772 | 10/1979 |
| DE | 37 02 137 | 8/1988 |
| DE | 199 10 968 | 11/2000 |
| DE | 10 2004 014 629 | 10/2005 |
| DE | 10 2005 023 365 | 11/2006 |
| EP | 0 602 984 | 6/1994 |
| JP | 6-132040 | 5/1994 |
| JP | 2003-36892 | 2/2003 |
| JP | 2006-278185 | 10/2006 |
| JP | 2008-41548 | 2/2008 |

* cited by examiner

*Primary Examiner* — Yogendra Gupta
*Assistant Examiner* — Emmanuel S Luk
(74) *Attorney, Agent, or Firm* — Kenyon & Kenyon

(57) ABSTRACT

An electrochemical energy storage device includes at least one cell having at least one cathode, one anode, and one electrolyte which enables a current flow from the anode to the cathode. The electrochemical storage device is connected to a reservoir which contains a cover layer-forming additive.

14 Claims, 2 Drawing Sheets

ELECTROCHEMICAL ENERGY STORAGE DEVICE HAVING A RESERVOIR FOR AN ADDITIVE

BACKGROUND OF THE INVENTION

1. Field of the Invention

The present invention relates to an electrochemical energy storage device and a method for operating an electrochemical energy storage device.

2. Description of Related Art

Lithium-ion accumulators are currently used to obtain high energy densities which, as high-energy accumulators, have energy densities of approximately 200 Ah/kg. They achieve energy densities of up to approximately 100 Ah/kg as high-power accumulators. The service life of such lithium-ion accumulators is currently generally six years maximum.

However, in particular for applications in electric and hybrid vehicles, the service life of lithium-ion accumulators used today is inadequate. In order to be able to economically operate and manufacture a vehicle of this type, it is necessary that the service life of the lithium-ion accumulator is in the range of 12 to 16 years.

For increasing the service life of an accumulator it is known from published European patent document EP-A 0 602 984 to use polycarbon disulfide as the cathode material which is not subject to polymerization or depolymerization during oxidation and reduction, i.e., the charge and discharge process of the accumulator. For example, lithium is also mentioned as the material for the anode. The service life of the accumulator is increased due to the fact that the cathode is not subject to polymerization and depolymerization. The disadvantage of the accumulator known from published European patent document EP-A 0 602 984 is that the anode is unprotected. This represents the limiting factor for the accumulator's service life.

BRIEF SUMMARY OF THE INVENTION

An electrochemical energy storage device designed according to the present invention includes at least one cell having at least one cathode, one anode, and one electrolyte which enables a current flow from the cathode to the anode. The electrochemical energy storage device is connected to at least one reservoir which contains an additive forming a cover layer.

Due to the cover layer-forming additive, cover layers are formed on the electrodes during the first operating cycles of the electrochemical energy storage device which protect the electrodes as well as the electrolyte from aging mechanisms during the further operation of the cell of the electrochemical energy storage device. Over time, these layers are partially broken up, which results in damaging side reactions within the cell, thereby reducing the service life of the cell. By using the cover layer-forming additive, which is contained in the reservoir and which is metered into the cell as needed, the stabilizing cover layers on the electrodes may be restored, thereby suppressing the known aging mechanisms and significantly extending the service life of the cell.

In order to supply the cover layer-forming additive to the cell only when needed, a closing unit between the cell and the reservoir is provided in one preferred specific embodiment using which the inflow from the reservoir to the cell may be closed or opened. The connection from the reservoir to the cell may be opened with the aid of the closing unit when a fresh supply of cover layer-forming additive is needed to restore the cover layer on the electrodes.

In an example embodiment, the closing unit is a valve or a piezoelectric diaphragm. The advantage of a piezoelectric diaphragm is that it is small, robust, and cost-effective and is additionally highly dynamic.

In one first example embodiment, each cell of the electrochemical energy storage device has its own reservoir. This makes it possible to integrate the reservoir into each cell.

In one alternative example embodiment, at least two cells of the electrochemical energy storage device have one shared reservoir, one closing unit being situated in the connection to each cell which is connected to the reservoir. Due to the closing unit in the connection to each cell, it is possible to supply the cover layer-forming additive to each cell from a shared reservoir only when it is needed for restoring the cover layer.

In one example embodiment, all cells of the electrochemical energy storage device have one shared reservoir. Here also, one closing unit is situated in the connection of the reservoir to each cell. The advantage of one shared reservoir for all cells of the electrochemical energy storage device is in particular that it is easily possible to replenish the cover layer-forming additive when it is used up. It is not necessary to refill a reservoir for each cell with the cover layer-forming additive, but rather only one reservoir has to be refilled.

To be able to meter the cover layer-forming additive into the cell at the desired point in time it is preferred when each closing unit is controlled by a control system to either open or close the inflow of the additive into the cell. The control system is a battery management system, for example. The SOH (state of health) of the electrochemical energy storage device is ascertained via the battery management system, for example. Based on the SOH, the point in time may be determined at which the cover layer-forming additive must be metered into the cell. The closing unit is opened for metering the cover layer-forming additive so that the cover layer-forming additive may flow into the cell. As soon as a sufficient quantity of additive has flowed into the cell, the closing unit is closed again so that no additional cover layer-forming additive may flow into the cell.

Moreover, the present invention relates to a method for operating an electrochemical energy storage device. According to the present invention, a cover layer-forming additive is metered into the cells of the electrochemical device at predefined points in time to increase the service life of the accumulator. As described above, the point in time for metering may be determined based on the SOH, for example. It is, of course, alternatively also possible to carry out the metering of the additive in a time-controlled manner. In addition, it is possible, for example, to replenish the additive within the scope of an inspection of the electrochemical energy storage device, during a vehicle inspection, for example, when the electrochemical energy storage device is installed in a vehicle.

Suitable additives, which restore the stabilizing cover layer on the anode and the cathode during operation of the electrochemical energy storage device, are vinylidene carbonate or 1-fluorobutylene carbonate, for example. Other suitable cover layer-forming additives are ethylene carbonate or alkyl phosphates, for example.

Preferred additives are vinylidene carbonate or 1-fluorobutylene carbonate.

The aforementioned additives are suitable in particular when the electrochemical energy storage device is a lithium-ion accumulator.

DETAILED DESCRIPTION OF THE INVENTION

Figure 1:
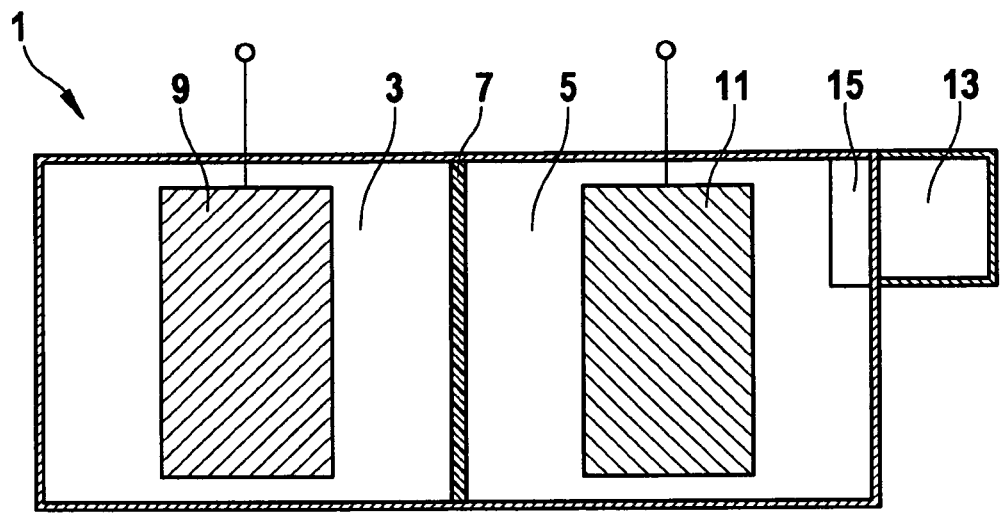
FIG. 1 shows a first example embodiment of a cell of an electrochemical energy storage device designed according to the present invention.

FIG. 1 shows a first example embodiment of a cell of an electrochemical energy storage device designed according to the present invention.

A cell 1 of an electrochemical energy storage device represents a galvanic unit in which current is generated by an electrochemical reaction. Cell 1 includes an anode space 3 and a cathode space 5. Anode space 3 is generally separated from cathode space 5 by a separator 7. At least one anode 9 is accommodated in anode space 3 and at least one cathode 11 is accommodated in cathode space 5.

Furthermore, anode space 3 as well as cathode space 5 contains an electrolyte (not shown here). According to the present invention, the electrolyte is liquid. The electrolyte generally includes a solvent having a high dielectric constant to be able to dissolve salts and possibly a low viscosity to facilitate the ion transport. Moreover, the electrolyte contains at least one salt which is dissolved in the solvent in a dissociated form.

Ethylene carbonate is used as the solvent of the electrolyte, for example. Other suitable solvents are, for example, methyl formiate, diethyl carbonate, ethyl acetate, methyl butyrate, ethyl butyrate, and many esters, for example tetrahydrofuran and some of its derivatives, or mixtures of aforementioned solvents.

As salt, the electrolyte contains $LiPF_6$, $LiBF_4$, or LiBOB (lithium bis(oxalato)borate), for example.

If the electrochemical energy storage device is a lithium-ion accumulator then anode 9 is, for example, an anode typical for lithium-ion accumulators as it is known to those skilled in the art. For example, a suitable anode 9 contains an intercalating compound on the basis of carbon, an alloy of lithium with tin and/or silicon, possibly also in a carbon matrix, metallic lithium, or lithium titanate. Cathode 11 is also a cathode typical for lithium-ion accumulators as it is known to those skilled in the art. Suitable materials for the cathode are, for example, lithium cobalt oxide, lithium nickel oxide, lithium cobalt-nickel oxide, lithium nickel-cobalt-manganese oxide, lithium nickel-cobalt-aluminum oxide, lithium iron oxide, lithium manganese dioxide, lithium manganese oxide, and mixed oxides of the lithium manganese oxide; lithium iron phosphate, lithium manganese phosphate, lithium cobalt phosphate and lithium nickel phosphate. Lithium cobalt oxide, lithium nickel oxide, lithium cobalt-nickel oxide, lithium nickel-cobalt-manganese oxide, lithium nickel-cobalt-aluminum oxide, lithium manganese oxide, lithium iron phosphate, and lithium manganese phosphate are preferably used as the cathode material.

Any separator known to those skilled in the art, as they are used in lithium-ion accumulators, is suitable as separator 7. Separator 7 is typically a semi-permeable diaphragm which is permeable for lithium ions.

For example, polypropylene, polyethylene, fluorinated hydrocarbons, hydrocarbons coated with ceramics, fiberglass, materials based on cellulose or mixtures of the aforementioned materials are suitable as the material for separator 7. Preferred materials for the separator are polyethylene and polypropylene.

In lithium-ion accumulators, cover layers on anode 9 and cathode 11 are formed during the first operating cycles, which in the ensuing operation of the lithium-ion accumulator protect anode 9 and cathode 11, as well as the electrolyte, from aging mechanisms. These cover layers are partially broken up over time which results in damaging side reactions of the cell chemistry and reduces the service life of cell 1. According to the present invention, the electrochemical energy storage device therefore contains a reservoir 13, containing an additive, using which the cover layers on anode 9 and cathode 11 are restored, thereby suppressing the aging mechanisms known from the related art, and the service life of cell 1 is extended significantly.

For example, vinylidene carbonate or 1-fluorobutylene carbonate are suitable as the cover layer-forming additive contained in reservoir 13. Other suitable additives are ethylene carbonate or alkyl phosphates.

In order to restore the cover layer on anode 9 and cathode 11, part of the additive from reservoir 13 is metered into cell 1. Due to the decomposition potential of the additive, it electrochemically reacts during the next charge process after metering and builds up a new cover layer. In particular, a new cover layer is built up at the breaking points in the cover layer on anode 9 and cathode 11.

Reservoir 13 is separated from anode space 3 and cathode space 5 of the cell by closing system 15. Suitable closing systems 15 are, for example, valves or piezoelectric diaphragms. Closing system 15 may additionally contain a pump for transporting the additive from reservoir 13 into anode space 3 or cathode space 5 of the cell.

Metering of the additive from reservoir 13 takes place in predefined time intervals. Predefined quantities of the additive from reservoir 13 are metered into the interior of cell 1. Metering of the additive from reservoir 13 into anode space 3 or cathode space 5 of cell 1 takes place in a volume-related manner. Detection of the metered quantities may be carried out by using any flow meter known to those skilled in the art. It is alternatively also possible to meter the additive into anode space 3 or cathode space 5 of cell 1 using a metering pump. The metering pump is situated here in closing system 15 between reservoir 13 and anode space 3 or cathode space 5 of cell 1.

In one example embodiment, closing system 15 is connected to a control unit which is not shown here. The opening interval and the opening duration of closing system 15 are established in the control unit for metering the additive from reservoir 13 into anode space 3 or cathode space 5 of cell 1. Furthermore, it is also possible that using the control system measuring data may be obtained from cell 1 from whose analysis the point in time and the quantity of the additive to be metered are determined. It is possible, for example, that the control unit is a battery management system using which the state of health (SOH) of the lithium-ion accumulators is analyzed. Based on the SOH, the quantity and the point in time for metering the additive may be determined. The SOH is determined here by methods corresponding to the cell type, e.g., the increase in the internal resistance.

In the example embodiment shown in FIG. 1, reservoir 13 is attached outside cell 1. In an electrochemical energy storage device, which includes multiple cells 1, it is possible in this way to supply all cells 1 with the additive via one shared reservoir 13. However, it is furthermore also possible that each individual cell 1 is provided with its own reservoir 13. If at least two cells 1 of the electrochemical energy storage device are supplied from one shared reservoir 13 then each cell 1 is connected to the electrochemical energy storage device. A which the connection between cell 1 and reservoir 13 may be closed is situated in the connection between cell 1 and reservoir 13. All closing systems 15 are preferably activated by a shared control unit.

Figure 2:
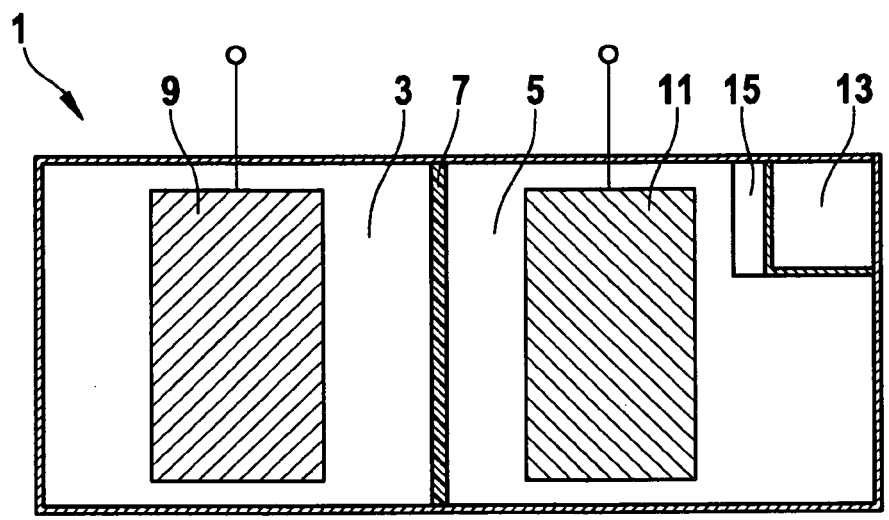
FIG. 2 shows a second example embodiment of a cell of an electrochemical energy storage device designed according to the present invention.

FIG. 2 shows a second example embodiment of a cell of an electrochemical energy storage device.

The example embodiment shown in FIG. 2 differs from the example embodiment shown in FIG. 1 by the placement of reservoir 13. In the example embodiment shown in FIG. 2, reservoir 13 is situated in the interior of cell 1. This has the advantage that the cell does not require additional storage space. However, due to reservoir 13 being situated within cell 1, the dimension of either anode 9 or cathode 11 must be reduced. On the one hand, as shown in FIG. 2, reservoir 13 may be situated in cathode space 5 and, on the other hand, it is also possible that the reservoir is situated in anode space 3. Moreover, it is also possible that the reservoir is situated in the area of separator 7 so that the reservoir is positioned in either anode space 3 or cathode space 5. The additive may be supplied either into anode space 3, into cathode space 5 or simultaneously into anode space 3 and cathode space 5.

In both example embodiments shown in FIG. 1 and FIG. 2, it is necessary that the additive is mixed with the electrolyte after metering so that it is able to reach both anode 9 as well as cathode 11 in order to restore the cover layers there. The electrolyte is generally mixed with the additive via diffusion.

Figure 3:
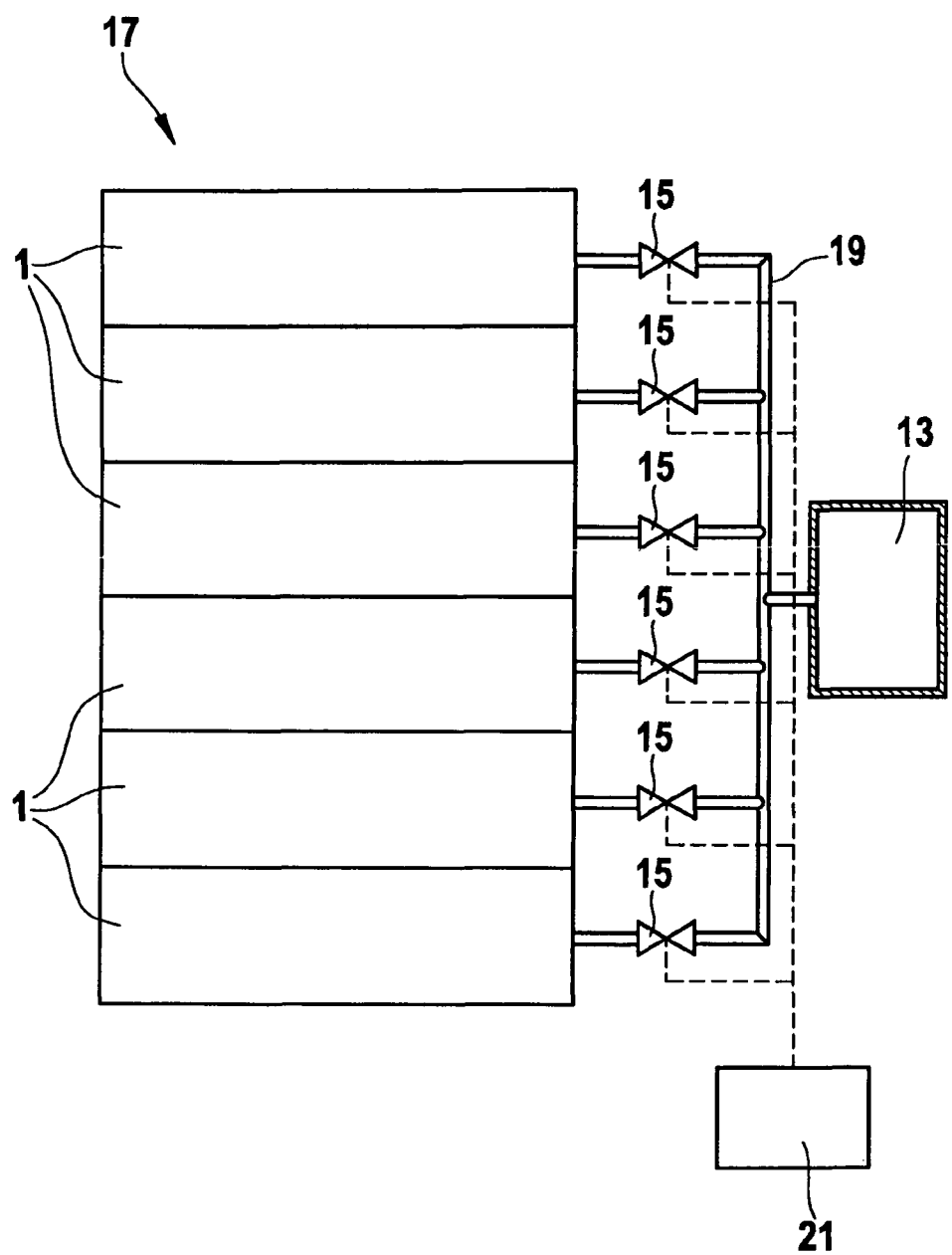
FIG. 3 schematically shows an electromechanical energy storage device designed according to the present invention having multiple modules.

FIG. 3 shows an electrochemical energy storage device having multiple cells 1.

In order to be able to obtain greater power, multiple cells 1 are connected to one electrochemical energy storage device 17. To achieve an extended service life of the entire electrochemical energy storage device 17, each cell 1 is connected to reservoir 13. The connection is established via a line system 19. Closing system 15 is situated within line system 19. Closing system 15 is a valve in the specific embodiment shown here. However, it is alternatively also possible that closing system 15 is a piezoelectric diaphragm, for example. Due to closing system 15, the connection of each cell 1 to reservoir 13 may be closed or opened. When the connection is open, additive may flow from reservoir 13 into cell 1. To ensure that the additive flows from reservoir 13 into the respective cells 1 only on demand, each closing system 15 is connected to a control unit 21. Control unit 21 transmits a signal to the appropriate closing system 15 so that it opens the connection from reservoir 13 to cell 1 when additive is to be metered. For determining the right point in time for metering of the additive it is possible, for example, that control unit 21 monitors the SOH of each individual cell 1. As soon as the SOH has reached a critical value, which is stored in control unit 21, closing system 15 to the appropriate cell 1 is opened so that the additive may flow from reservoir 13 into cell 1. The quantity of the additive to be metered is also detected via control unit 21, for example. It is possible, for example, that a metering pump is placed upstream from closing system 15 which is designed as a valve. Alternatively, it is also possible, of course, that the metering pump is used as closing system 15. It is also possible that the volume flow which flows into cell 1 is detected via a flow meter as it is known to those skilled in the art. As soon as the intended quantity of additive has been metered into cell 1, closing system 15 closes the connection from the cell to reservoir 13 again. Due to the metering of the additive, the electrochemical energy storage device having multiple cells 1 may be operated over a longer period of time than electrochemical energy storage devices currently in use. This is desired, for example, when the electrochemical energy storage device is used in a hybrid or electric vehicle.

What is claimed is:

1. An electrochemical energy storage device system, comprising:
   an electrochemical energy storage device comprising at least one cell including at least one cathode, at least one anode, and at least one electrolyte, wherein the electrolyte enables a current flow from the anode to the cathode;
   a reservoir connected to the electrochemical energy storage device and containing a cover-layer-forming additive;
   a control unit for selectively starting or stopping an inflow of the additive into the at least one cell;
   wherein the control unit is adapted to control a metering of the cover layer-forming additive into the at least one cell at a predefined point in time;
   wherein the control unit is adapted to determine a predefined point in time for metering from a state of health of the electrochemical energy storage device; and
   wherein the control unit meters the cover layer-forming additive to restore stabilizing cover layers on the at least one cathode and the at least one anode.

2. The electrochemical energy storage device system as recited in claim 1, further comprising:
   a closing system provided between the cell and the reservoir, wherein the closing system is configured to selectively close or open an inflow channel from the reservoir into the cell.

3. The electrochemical energy storage device system as recited in claim 2, wherein the closing system is one of a valve or a piezoelectric diaphragm.

4. The electrochemical energy storage device system as recited in claim 3, wherein each cell of the electrochemical energy storage device is connected to a corresponding dedicated reservoir.

5. The electrochemical energy storage device system as recited in claim 4, wherein each reservoir is integrated into the corresponding cell.

6. The electrochemical energy storage device system as recited in claim 3, wherein at least two cells of the electrochemical energy storage device are connected to one shared reservoir, and wherein the closing system is situated within the connection between the shared reservoir and each of the two cells.

7. The electrochemical energy storage device system as recited in claim 6, wherein all cells of the electrochemical energy storage device are connected to one shared reservoir, and wherein the closing system is situated within the connection between the shared reservoir and each of the cells.

8. The electrochemical energy storage device system as recited in claim 7, wherein the control unit is adapted to activated each closing system situated within the connection between the shared reservoir and each of the cells.

9. The electrochemical energy storage device system as recited in claim 8, wherein the control unit is a battery management system.

10. The electrochemical energy storage device system as recited in claim 8, wherein the additive is one of vinylidene carbonate, 1-fluorobutylene carbonate, ethylene carbonate or alkyl phosphates.

11. The electrochemical energy storage device system as recited in claim 8, wherein the electrochemical energy storage device is a lithium-ion accumulator.

12. A method for operating an electrochemical energy storage device including at least one cell having at least one cathode, one anode, and one electrolyte which enables a current flow from the anode to the cathode, comprising:
- metering a cover layer-forming additive into the at least one cell at a predefined point in time;
- wherein the predefined point in time for metering is determined from a state of health of the electrochemical energy storage device; and
- wherein the cover layer-forming additive is used to restore stabilizing cover layers on the at least one cathode and the at least one anode.

13. An electrochemical energy storage device system, comprising:
- an electrochemical energy storage device comprising at least one cell including at least one cathode, at least one anode, and at least one electrolyte, wherein the electrolyte enables a current flow from the anode to the cathode;
- a reservoir connected to the electrochemical energy storage device and containing a cover-layer-forming additive;
- a control unit for selectively starting or stopping an inflow of the additive into the at least one cell;
- wherein the control unit is adapted to control a metering of the cover layer-forming additive into the at least one cell at a predefined point in time;
- wherein the control unit is adapted to determine a predefined point in time for metering from an increase in an internal resistance of the electrochemical energy storage device; and
- wherein the control unit meters the cover layer-forming additive to restore stabilizing cover layers on the at least one cathode and the at least one anode.

14. A method for operating an electrochemical energy storage device including at least one cell having at least one cathode, one anode, and one electrolyte which enables a current flow from the anode to the cathode, comprising:
- metering a cover layer-forming additive into the at least one cell at a predefined point in time;
- wherein the predefined point in time for metering is determined from an increase in an internal resistance of the electrochemical energy storage device; and wherein the cover layer-forming additive is used to restore stabilizing cover layers on the at least one cathode and the at least one anode.

* * * * *

UNITED STATES PATENT AND TRADEMARK OFFICE
CERTIFICATE OF CORRECTION

PATENT NO. : 8,617,733 B2  Page 1 of 1
APPLICATION NO. : 12/451306
DATED : December 31, 2013
INVENTOR(S) : Wahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this
Twenty-second Day of September, 2015

Michelle K. Lee
*Director of the United States Patent and Trademark Office*